(12) United States Patent
Wang et al.

(10) Patent No.: US 10,026,447 B2
(45) Date of Patent: Jul. 17, 2018

(54) METHOD, APPARATUS AND SYSTEM FOR PRIORITY PROCESSING

(71) Applicant: CANON KABUSHIKI KAISHA, Tokyo (JP)

(72) Inventors: I. J. Eric Wang, Denistone (AU); Jie Xu, Eastwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 14/977,260

(22) Filed: Dec. 21, 2015

(65) Prior Publication Data

US 2016/0189748 A1 Jun. 30, 2016

(30) Foreign Application Priority Data

Dec. 24, 2014 (AU) .................. 2014280952

(51) Int. Cl.
| | |
|---|---|
| *G11B 27/00* | (2006.01) |
| *H04N 5/93* | (2006.01) |
| *H04N 9/80* | (2006.01) |
| *G11B 27/031* | (2006.01) |
| *G11B 27/28* | (2006.01) |

(52) U.S. Cl.
CPC ............ *G11B 27/031* (2013.01); *G11B 27/28* (2013.01)

(58) Field of Classification Search
None
See application file for complete search history.

(56) References Cited

U.S. PATENT DOCUMENTS

| | | |
|---|---|---|
| 9,143,742 B1* | 9/2015 | Amira ................. H04N 7/181 |
| 2009/0172685 A1 | 7/2009 | Shavit |
| 2011/0026901 A1* | 2/2011 | Kashima ............. G11B 27/034 386/282 |
| 2012/0030376 A1 | 2/2012 | Lemus et al. |
| 2012/0179745 A1 | 7/2012 | Chen et al. |

FOREIGN PATENT DOCUMENTS

WO       2009055929 A1    5/2009

* cited by examiner

*Primary Examiner* — Heather Jones
(74) *Attorney, Agent, or Firm* — Canon USA, Inc. I.P. Division

(57) ABSTRACT

A method of scheduling processing of a plurality of recorded media content items, each recorded media content item having one or more media segments which each represent a coverage option for a story fragment. The method receives a quality measure for each media segment in the plurality of recorded media content items, and determines a fitness score for each of a plurality of candidate sequences formed from the media segments, said fitness score being determined using the corresponding quality measure associated with media segments in the corresponding candidate sequence. The method determines a media segment score for each media segment from the corresponding fitness scores of candidate sequences that include that media segment, and then schedules processing of the plurality of recorded media content items in an order determined from media segment scores of the media segments in the recorded media content item.

20 Claims, 9 Drawing Sheets

METHOD, APPARATUS AND SYSTEM FOR PRIORITY PROCESSING

REFERENCE TO RELATED PATENT APPLICATION(S)

This application claims the benefit under 35 U.S.C. § 119 of the filing date of Australian Patent Application No. 2014280952, filed Dec. 24, 2014, hereby incorporated by reference in its entirety as if fully set forth herein.

TECHNICAL FIELD

The present invention relates to a method for scheduling processing of content items to improve digital film production, and, in particular, to a method, apparatus and system for scheduling processing of video content items. The present invention also relates to a computer program product including a computer readable medium having recorded thereon a computer program for scheduling processing of video content items.

BACKGROUND

The advent of digital imaging technology has altered the behaviour of the film industry, in the sense that more and more movies or professional videos are shot digitally during their production. Digital cinematography, the process of capturing video content as digital content items, has become increasingly prevalent for film production. The main advantage of digital cinematography is that it can store, transmit, and retrieve a large amount of information with high fidelity relevant to the originally recorded data. Information stored in digital formats provides for convenient processing and manipulation by digital operations such as transcoding, transferring, duplication, image processing, converting, and colour grading operations.

During digital cinematography, video content is stored as media content items in digital format. Quite often the media content items are encoded by compression algorithms such as MPEG-2 and H.264 to keep the item size down to thereby reduce storage and communication requirements. Also, increasingly, media content items are stored as raw image files or digital negatives containing minimally processed data received from the image sensor. However the formats of the compressed media content items or raw content items are not suitable for editing. Accordingly it is necessary to convert those formats into appropriate file formats for editing, such as Apple™ ProRes® and Avid™ DNxHD®. Such processing is regarded as transcoding, in which media content items encoded in one format are converted into other digital formats suitable for post-production.

Given the computationally intensive nature of compression and the growing volume of digital video content during a movie or professional video production, the transcoding process can take as long as the actual shooting time itself. Post production usually starts after all the media content items for a movie or professional video have been batched transcoded. This delay is due to the dependencies between the media content items and the fact that they are often shot in an order different from intended storyline.

SUMMARY

It is an object of the present invention to substantially overcome, or at least ameliorate, one or more disadvantages of existing production and post-production arrangements.

Disclosed are arrangements which facilitate the production and post-production of film production using digital cinematography, by rearranging or prioritising the video content items required for production or post-production processing, such as transcoding and transferring for cloud storage.

According to one aspect of the present disclosure there is provided a method of scheduling processing of a plurality of recorded media content items, each recorded media content item having one or more media segments which each represent a coverage option for a story fragment, said method comprising:

receiving a quality measure for each media segment in the plurality of recorded media content items;

determining a fitness score for each of a plurality of candidate sequences formed from the media segments, said fitness score being determined using the corresponding quality measure associated with media segments in the corresponding candidate sequence;

determining a media segment score for each media segment from the corresponding fitness scores of candidate sequences that include that media segment; and scheduling processing of the plurality of recorded media content items in an order determined from media segment scores of the media segments in the recorded media content item.

Desirably the method further comprises receiving one or more candidate sequences defining constraints on the segments for representing story fragments.

Preferably the processing of the plurality of the recorded media content items is scheduled for one of transcoding, transferring, duplication, image processing, converting, or colour grading operations.

In advantageous implementations, the quality measure is estimated using at least one of the following factors:
  (i) camera factors;
  (ii) video encoding factors;
  (iii) image quality factors; and
  (iv) performance factors.

Preferably the constraints on the segments can be defined using at least one of the following factors:
  (i) capturing context;
  (ii) story setting;
  (iii) character setting;
  (iv) action setting; and
  (v) associated segment metadata.

The method may further comprise receiving a prioritisation of each of the story fragments represented by the segments, wherein the scheduling further comprises using the prioritisation of story fragments associated with the corresponding media segment.

Desirably the receiving of factors for the quality measure comprises at least one of manual input, software-based computations, software-based computations using quality estimation algorithms implemented on computers, hardware-based computations, and hardware-based computations using quality estimation algorithms implemented using integrated circuitry.

In another example the candidate sequences are created by at least one of manually, by one of a production company and a creative director, and by machine learning algorithms that learn the characteristics of existing movie products.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Context

Narrative films, which are probably the most widely screened films in theatres, are one type of film product that tell a story. The making of narrative films is often regarded as narrative film making. The goal of narrative film making is to compose a sequence of events in audio and/or visual form based on a story. With the advent of digital imaging technology, digital cinematography which is often referred to as the high-quality acquisition of video data using digital image sensors during film production, has become increasingly widespread for narrative film making.

Figure 1A:
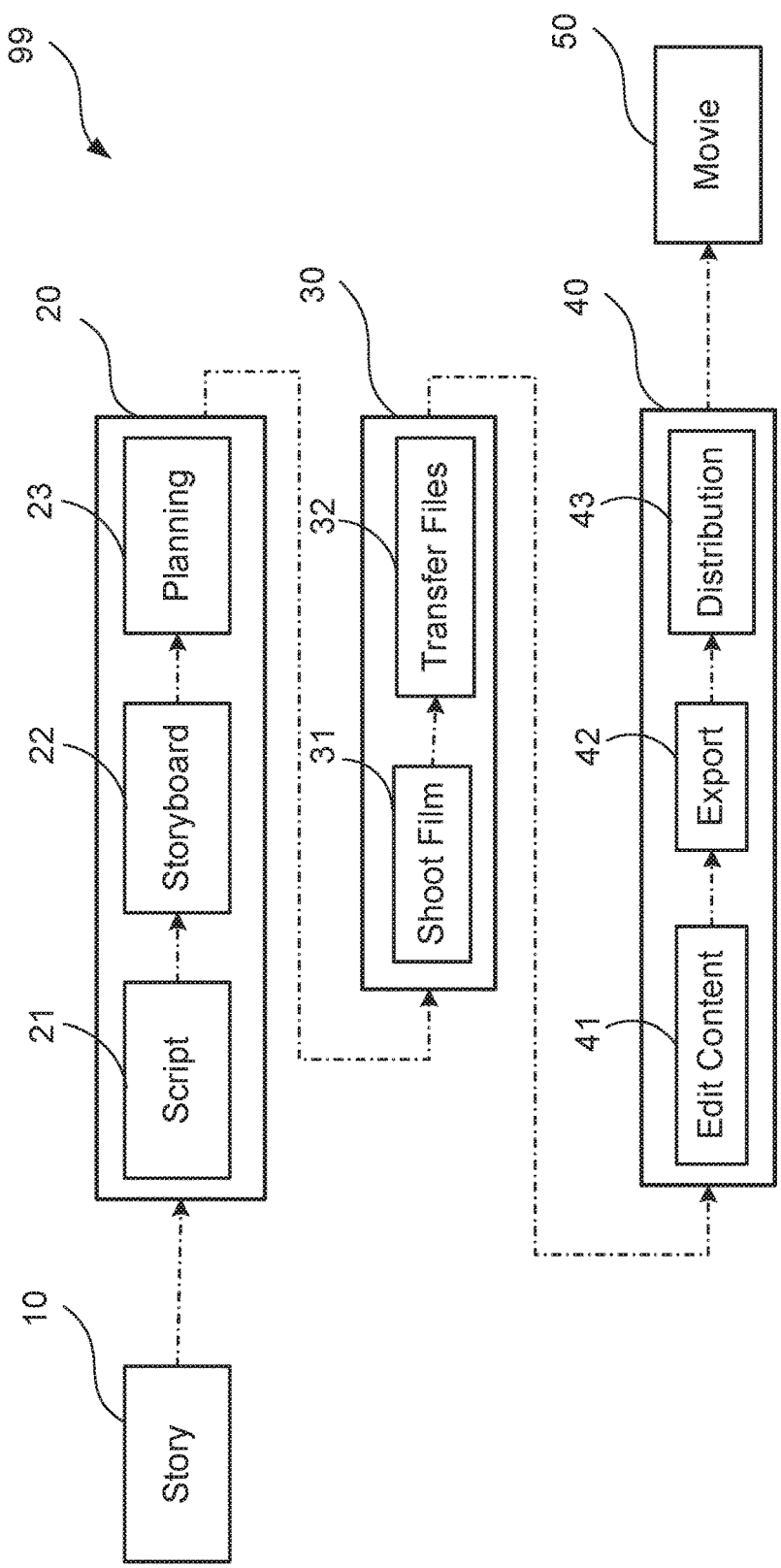
FIG. 1A is a schematic flow diagram illustrating the workflow of digital cinematography for narrative film making.

FIG. 1A is a schematic flow diagram illustrating an exemplary workflow 99 of digital cinematography for narrative film making. The workflow comprises three stages, namely pre-production 20, production 30, and post-production 40. Given a story 10 for a narrative film, the pre-production 20 starts formally once the related film project has been approved. At this stage, key-elements such as financing, principal cast members, director, and cinematographers are confirmed.

During the pre-production 20, a script 21 is written based on the story by screenwriters, which usually includes dialogues between characters, as well as instructions on movements, actions, and expressions. The composed script 21 defines a storyline for storytelling, which is essentially a sequence of events that advance the story. Each individual event can be considered as a story fragment of the given story. It is also commonly referred to as a beat in filmmaking, and its duration is highly variable and dependent on the pace that a director wants the story to unfold. The script 21 is then broken down into individual scenes in light of the storyline, which are typically represented by one or more storyboards 22. A storyboard visualizes a scene in a film in the form of illustrations or images before the film has been produced. It serves to identify potential problems before they occur. Storyboards also help to estimate the costs of the production. The preproduction 20 concludes with a planning 23 step, in which a detailed schedule for arrangements of necessary elements to be ready for the film-maker at the appropriate times will be made.

Following the pre-production 20 is the production 30 stage, whose purpose is to gather content in the form of audio and/or visual elements for storytelling. Specifically for visual elements, different shots are made for different scenes through shooting 31 with an imaging capturing apparatus, such as a digital camera. A shot is a basic unit of film production, which means the continuous recording of a scene from the time the camera starts until it stops. A shot provides an editor with a coverage option for the story fragments that the shot encompasses. Multiple runs of a camera are a common practise when filming a shot, for they ensure enough alternatives with good quality for editing with that shot. Each alternative version of a shot is considered as a take for that shot, which is usually stored as a content item. One content item can be broken down into multiple segments according to the story fragments that the shot encompasses, each of which corresponds to a coverage option for the corresponding story fragment.

During production 30, visual elements such as captured video content are usually encoded either in MPEG-2 or H.214 format, which reduces the size of the video content by compression. In the course of shooting, the captured video content is stored in on-board camera storage or an external field recorder. Increasingly, due to the availability of large mobile storage capacity, the captured video content is stored raw image files containing minimally processed data as captured by the image sensor. Once shooting is accomplished, the data is then transferred 32 to external data storage located on a workstation to be used in the post-production stage 40. This transfer process is often regarded as the ingestion. With the advent of cloud computing technology, the data can also be transferred to cloud storage for post-production. Cloud services such as Adobe™ Creative Cloud® enables collaboration for data transferred to the cloud storage.

The production stage 30 is followed by the post-production stage 40. During the post-production stage 40, the captured content is edited 41 and then exported 42 to various formats such as Digital Versatile Disc (DVD), Blu-ray Disc™ (BD), Holographic Versatile Disc (HVD), etc. for distribution 43. The editing 41 process consists of reviewing the content and assembling the movie. For visual elements, some image processing algorithms may be applied to the video content during reviewing. Those algorithms may include, but are not limited to: quality enhancing (tweaking illumination, stabilizing shaky frames, sharpening, contrasting colours, removing noises), creating special effect for video (mosaicking, diffusing), transformation (cropping/rotating/flipping/resizing frames), etc. To assemble a movie, segments representing different coverage options of story fragments are picked from content items and then arranged along the storyline into a sequence. To ensure the smooth, continuous and coherent transitions between the segments, continuity editing is usually involved. This creates illusions of temporal and spatial continuity between segments via techniques such as dissolves and fades, eyeline match, shot reverse shot, etc. The sequence generated after the first assemblage is usually termed as the "rough cut", which will be improved to become the "final cut" through iterative reviews. The time editing taken to complete this process is usually proportional to the amount of video content recorded.

For the video content, the encoding schemes such as MPEG-2 and H.214 do not support random access for the data, due to their inter-frame encoding nature. Intra-frame encoding formats such as Apple™ ProRes® and Avid™ DNxHD® are required for video editing. On the other hand, raw image files are difficult to work with as they require significant computing power. As a consequence, transcoding, which converts the ingested data into formats suitable for video editing, and which generally occurs between steps 32 and 41 in FIG. 1, is required for film editing. The output sequence of the post-production stage 40 is a movie product 50.

Transcoding is an important step in digital cinematography as post-production relies on it. It is a common practise to start post-production only after all the content items have been transcoded.

Overview

The arrangements presently disclosed relate to a scheduling method for the processing of content items. The processing is typically performed in a single batch in that a particular current processing operation is completed for all content items before the content items are passed to the subsequent processing operation. Quite often the subsequent operation may not start until the batch processing has been finished. In one implementation, the present arrangements relate to a priority transcoding scheme for post-production in digital cinematography. This results in an efficient production in which film editors can start post-production on already-transcoded content items without waiting for all content items to have been transcoded. These arrangements may be associated with different types of batch processing for content items in post-production. Examples of the processing may include, but are not limited to, content transferring, content duplication, content converting, and colour grading. All of these processing operations require accessing low-level information of the content item, e.g. pixels, of either raw image data or more commonly decoded from compressed image data. Accordingly it is time-consuming for each process to finish. The long processing time may cause delays to any dependent operations on content items. Each of the processing operations may be made more efficient by the presently disclosed arrangements by prioritising content items for processing. The prioritisation may be received or referenced as an additional input. More details for prioritisation are covered the following sections.

Structural Implementation

Figure 6A:
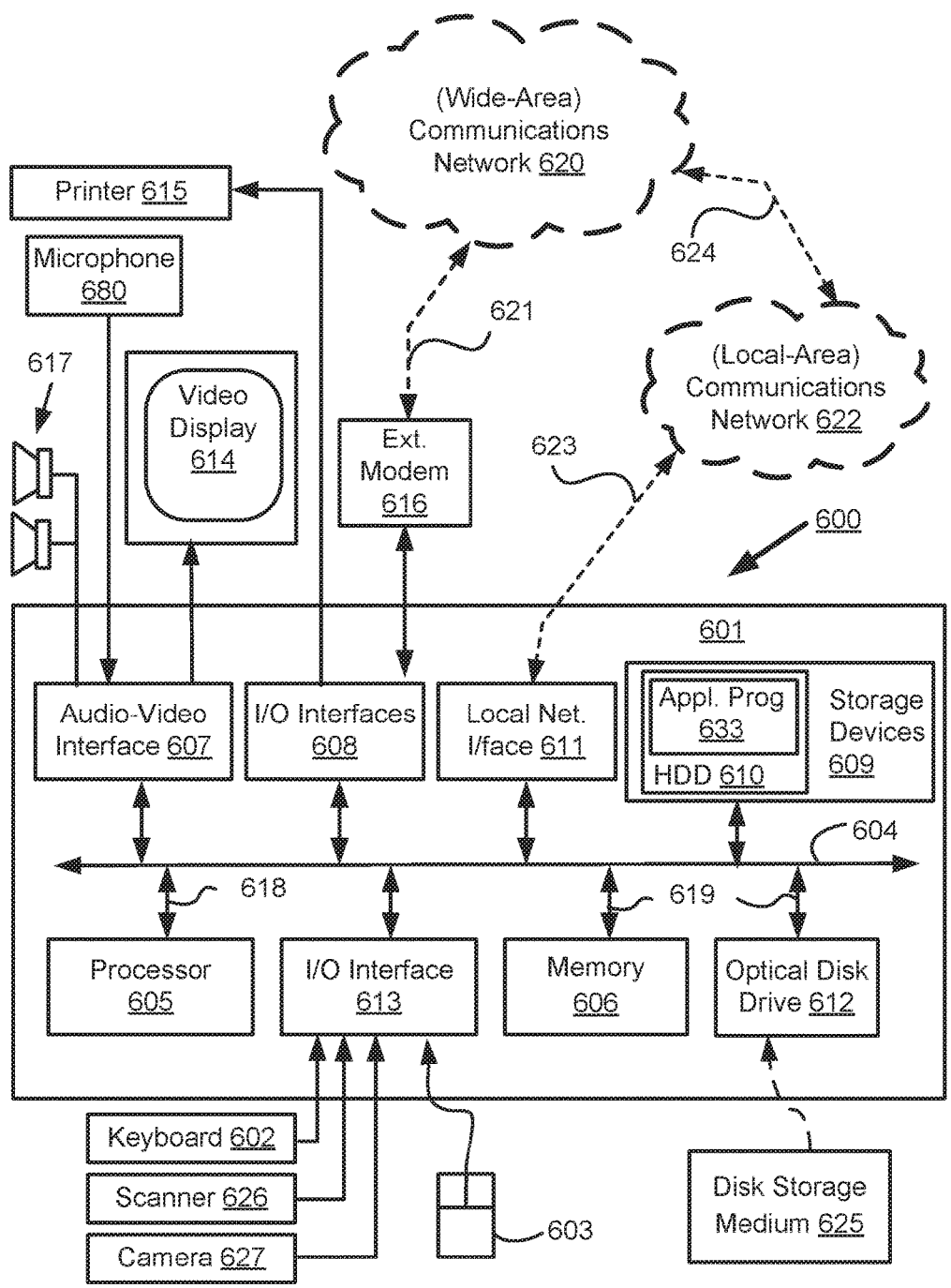
FIGS. 6A and 6B collectively form a schematic block diagram of a general purpose computer system upon which arrangements described can be practiced.
Figure 6B:
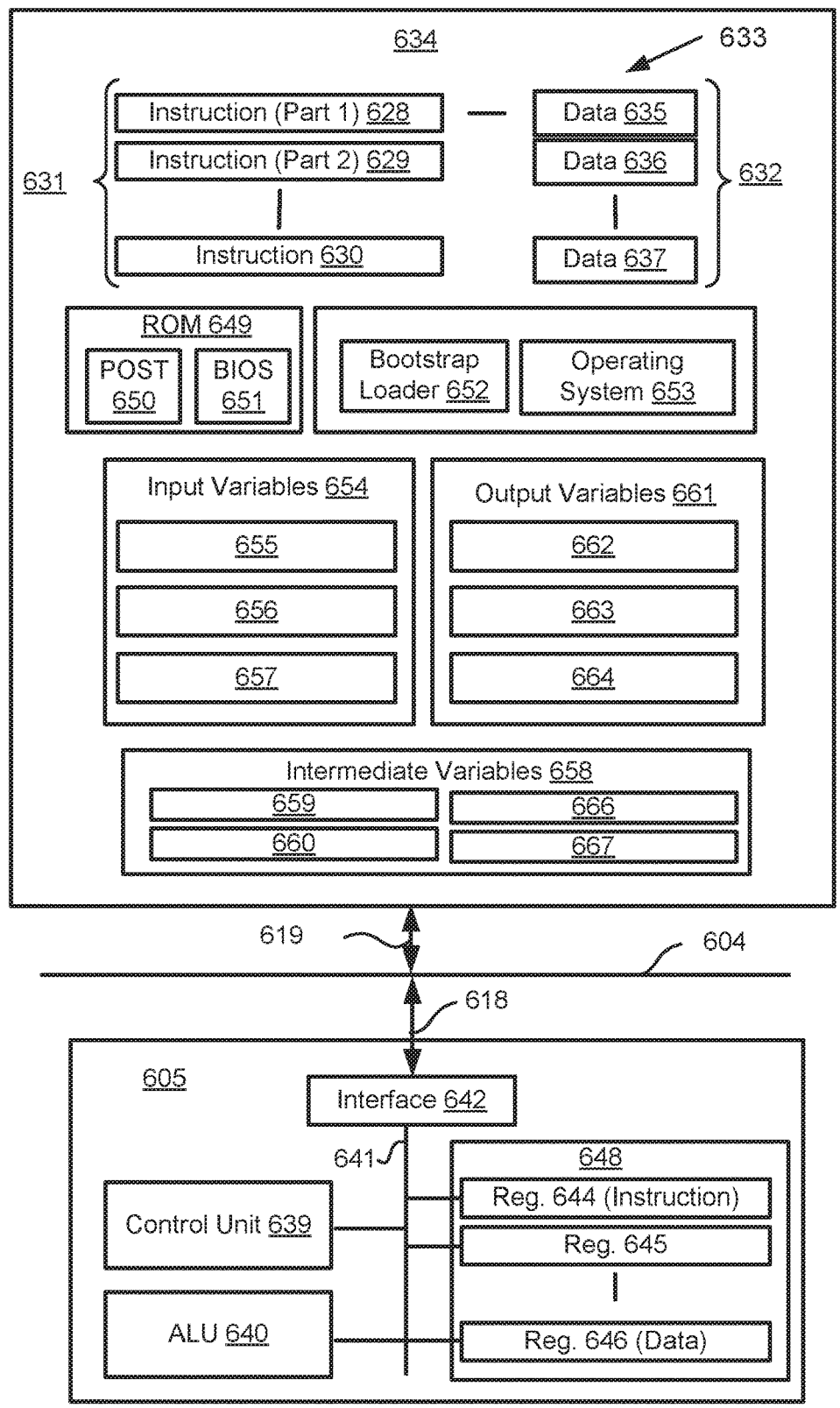

FIGS. 6A and 6B depict a general-purpose computer system 600, upon which the various arrangements described can be practiced.

As seen in FIG. 6A, the computer system 600 includes: a computer module 601; input devices such as a keyboard 602, a mouse pointer device 603, a scanner 626, a digital camera 627, and a microphone 680; and output devices including a printer 615, a display device 614 and loudspeakers 617. An external Modulator-Demodulator (Modem) transceiver device 616 may be used by the computer module 601 for communicating to and from a communications network 620 via a connection 621. The communications network 620 may be a wide-area network (WAN), such as the Internet, a cellular telecommunications network, or a private WAN. Where the connection 621 is a telephone line, the modem 616 may be a traditional "dial-up" modem. Alternatively, where the connection 621 is a high capacity (e.g., cable) connection, the modem 616 may be a broadband modem. A wireless modem may also be used for wireless connection to the communications network 620.

With reference to the foregoing description, the computer module 601 may be located in association with equipment used for the production stage 30, in which case equipment associated with post-production 40 may be located in the "cloud", for example as part of the networks 620 and 622. In other implementations, the locations may be reversed with the computer 601 representing a cloud computing device linked to the production equipment 30 via the networks 620, 622. In some implementations, aspects of both production 30 and post production 40 may be performed using the computer 601.

The computer module 601 typically includes at least one processor unit 605, and a memory unit 606. For example, the memory unit 606 may have semiconductor random access memory (RAM) and semiconductor read only memory (ROM). The computer module 601 also includes a number of input/output (I/O) interfaces including: an audio-video interface 607 that couples to the video display 614, loudspeakers 617 and microphone 680; an I/O interface 613 that couples to the keyboard 602, mouse 603, scanner 626, one or more digital cameras 627, by which the shots are captured, and optionally a joystick or other human interface device (not illustrated); and an interface 608 for the external modem 616 and printer 615. In some implementations, the modem 616 may be incorporated within the computer module 601, for example within the interface 608. The computer module 601 also has a local network interface 611, which permits coupling of the computer system 600 via a connection 623 to a local-area communications network 622, known as a Local Area Network (LAN). As illustrated in FIG. 6A, the local communications network 622 may also couple to the wide network 620 via a connection 624, which would typically include a so-called "firewall" device or device of similar functionality. The local network interface 611 may comprise an Ethernet circuit card, a Bluetooth™ wireless arrangement or an IEEE 802.11 wireless arrangement; however, numerous other types of interfaces may be practiced for the interface 611.

The I/O interfaces 608 and 613 may afford either or both of serial and parallel connectivity, the former typically being implemented according to the Universal Serial Bus (USB) standards and having corresponding USB connectors (not illustrated). Storage devices 609 are provided and typically include a hard disk drive (HDD) 610. Other storage devices such as a floppy disk drive and a magnetic tape drive (not illustrated) may also be used. An optical disk drive 612 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 600.

The components 605 to 613 of the computer module 601 typically communicate via an interconnected bus 604 and in a manner that results in a conventional mode of operation of the computer system 600 known to those in the relevant art. For example, the processor 605 is coupled to the system bus 604 using a connection 618. Likewise, the memory 606 and optical disk drive 612 are coupled to the system bus 604 by connections 619. Examples of computers on which the described arrangements can be practised include IBM-PC's and compatibles, Sun Sparcstations, Apple Mac™ or a like computer systems.

The methods of scheduling processing of a plurality of recorded media content items may be implemented using the computer system 600 wherein the processes of FIGS. 1B to 5, to be described, may be implemented as one or more software application programs 633 executable within the computer system 600. In particular, the steps of the methods of scheduling processing of a plurality of recorded media content items are effected by instructions 631 (see FIG. 6B) in the software 633 that are carried out within the computer system 600. The software instructions 631 may be formed as one or more code modules, each for performing one or more particular tasks. The software may also be divided into two separate parts, in which a first part and the corresponding code modules performs the scheduling methods and a second part and the corresponding code modules manage a user interface between the first part and the user.

The software may be stored in a computer readable medium, including the storage devices described below, for example. The software is loaded into the computer system 600 from the computer readable medium, and then executed by the computer system 600. A computer readable medium having such software or computer program recorded on the computer readable medium is a computer program product. The use of the computer program product in the computer system 600 preferably effects an advantageous apparatus for scheduling processing of a plurality of recorded media content items.

The software 633 is typically stored in the HDD 610 or the memory 606. The software is loaded into the computer system 600 from a computer readable medium, and executed by the computer system 600. Thus, for example, the software 633 may be stored on an optically readable disk storage medium (e.g., CD-ROM) 625 that is read by the optical disk drive 612. A computer readable medium having such software or computer program recorded on it is a computer program product. The use of the computer program product in the computer system 600 preferably effects an apparatus for scheduling processing of a plurality of recorded media content items.

In some instances, the application programs 633 may be supplied to the user encoded on one or more CD-ROMs 625 and read via the corresponding drive 612, or alternatively may be read by the user from the networks 620 or 622. Still further, the software can also be loaded into the computer system 600 from other computer readable media. Computer readable storage media refers to any non-transitory tangible storage medium that provides recorded instructions and/or data to the computer system 600 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 601. Examples of transitory or non-tangible computer readable transmission media that may also participate in the provision of software, application programs, instructions and/or data to the computer module 601 include radio or infra-red transmission channels as well as a network connection to another computer or networked device, and the Internet or Intranets including e-mail transmissions and information recorded on Websites and the like.

The second part of the application programs 633 and the corresponding code modules mentioned above may be executed to implement one or more graphical user interfaces (GUIs) to be rendered or otherwise represented upon the display 614. Through manipulation of typically the keyboard 602 and the mouse 603, a user of the computer system 600 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 617 and user voice commands input via the microphone 680.

FIG. 6B is a detailed schematic block diagram of the processor 605 and a "memory" 634. The memory 634 represents a logical aggregation of all the memory modules (including the HDD 610 and semiconductor memory 606) that can be accessed by the computer module 601 in FIG. 6A.

When the computer module 601 is initially powered up, a power-on self-test (POST) program 650 executes. The POST program 650 is typically stored in a ROM 649 of the semiconductor memory 606 of FIG. 6A. A hardware device such as the ROM 649 storing software is sometimes referred to as firmware. The POST program 650 examines hardware within the computer module 601 to ensure proper functioning and typically checks the processor 605, the memory 634 (609, 606), and a basic input-output systems software (BIOS) module 651, also typically stored in the ROM 649, for correct operation. Once the POST program 650 has run successfully, the BIOS 651 activates the hard disk drive 610 of FIG. 6A. Activation of the hard disk drive 610 causes a bootstrap loader program 652 that is resident on the hard disk drive 610 to execute via the processor 605. This loads an operating system 653 into the RAM memory 606, upon which the operating system 653 commences operation. The operating system 653 is a system level application, executable by the processor 605, to fulfil various high level functions, including processor management, memory management, device management, storage management, software application interface, and generic user interface.

The operating system 653 manages the memory 634 (609, 606) to ensure that each process or application running on the computer module 601 has sufficient memory in which to execute without colliding with memory allocated to another process. Furthermore, the different types of memory available in the system 600 of FIG. 6A must be used properly so that each process can run effectively. Accordingly, the aggregated memory 634 is not intended to illustrate how particular segments of memory are allocated (unless otherwise stated), but rather to provide a general view of the memory accessible by the computer system 600 and how such is used.

As shown in FIG. 6B, the processor 605 includes a number of functional modules including a control unit 639, an arithmetic logic unit (ALU) 640, and a local or internal memory 648, sometimes called a cache memory. The cache memory 648 typically includes a number of storage registers 644-646 in a register section. One or more internal busses 641 functionally interconnect these functional modules. The processor 605 typically also has one or more interfaces 642 for communicating with external devices via the system bus 604, using a connection 618. The memory 634 is coupled to the bus 604 using a connection 619.

The application program 633 includes a sequence of instructions 631 that may include conditional branch and loop instructions. The program 633 may also include data 632 which is used in execution of the program 633. The instructions 631 and the data 632 are stored in memory locations 628, 629, 630 and 635, 636, 637, respectively. Depending upon the relative size of the instructions 631 and the memory locations 628-630, a particular instruction may be stored in a single memory location as depicted by the instruction shown in the memory location 630. Alternately, an instruction may be segmented into a number of parts each of which is stored in a separate memory location, as depicted by the instruction segments shown in the memory locations 628 and 629.

In general, the processor 605 is given a set of instructions which are executed therein. The processor 605 waits for a subsequent input, to which the processor 605 reacts to by executing another set of instructions. Each input may be provided from one or more of a number of sources, including data generated by one or more of the input devices 602, 603, data received from an external source across one of the networks 620, 622, data retrieved from one of the storage devices 606, 609 or data retrieved from a storage medium 625 inserted into the corresponding reader 612, all depicted in FIG. 6A. The execution of a set of the instructions may in some cases result in output of data. Execution may also involve storing data or variables to the memory 634.

The disclosed scheduling arrangements use input variables 654, which are stored in the memory 634 in corresponding memory locations 655, 656, 657. The scheduling arrangements produce output variables 661, which are stored in the memory 634 in corresponding memory locations 662, 663, 664. Intermediate variables 658 may be stored in memory locations 659, 660, 666 and 667.

Referring to the processor 605 of FIG. 6B, the registers 644, 645, 646, the arithmetic logic unit (ALU) 640, and the control unit 639 work together to perform sequences of micro-operations needed to perform "fetch, decode, and execute" cycles for every instruction in the instruction set making up the program 633. Each fetch, decode, and execute cycle comprises:

(i) a fetch operation, which fetches or reads an instruction 631 from a memory location 628, 629, 630;

(ii) a decode operation in which the control unit 639 determines which instruction has been fetched; and (iii) an execute operation in which the control unit 639 and/or the ALU 640 execute the instruction.

Thereafter, a further fetch, decode, and execute cycle for the next instruction may be executed. Similarly, a store cycle may be performed by which the control unit 639 stores or writes a value to a memory location 632.

Each step or sub-process in the processes of FIGS. 1B to 5 is associated with one or more segments of the program 633 and is performed by the register section 644, 645, 646, the ALU 640, and the control unit 639 in the processor 605 working together to perform the fetch, decode, and execute cycles for every instruction in the instruction set for the noted segments of the program 633.

The methods of process scheduling may alternatively be implemented in dedicated hardware such as one or more integrated circuits performing the functions or sub functions of scheduling processing of a plurality of recorded media content items. Such dedicated hardware may include graphic processors, digital signal processors, or one or more microprocessors and associated memories.

Method

Figure 1B:
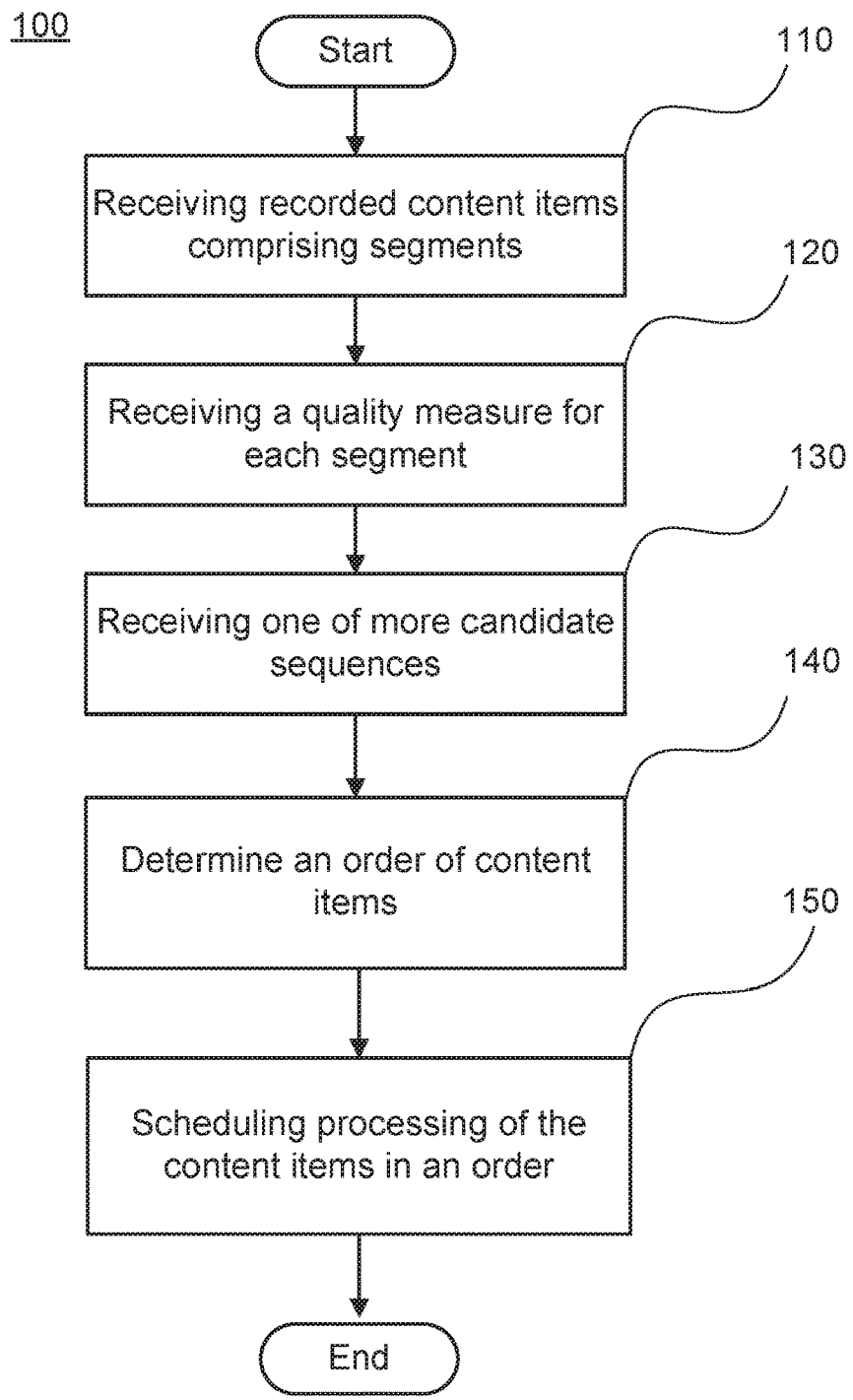
FIGS. 1B and 1C collectively form a schematic flow diagram illustrating a method of scheduling processing of video content items.

FIG. 1B is a schematic flow diagram showing a method 100 of scheduling content items for processing. The method 100 is preferably implemented in software for example as a component of the application 633 as executed by the processor 605. The method 100 begins with (first) inputting step 110, where recorded media content items are received. This may be from the HDD 610 or from the networks 620 or 622. Each content item may include one or more media segments. The media may be wholly visual, wholly audio, or most typically, a combination of visual and audio (i.e. commonly accepted as "video"). For visual elements in digital cinema production, each content item is a video sequence comprising a plurality of frames. Each segment may be described by one or more segment properties. A segment property refers to any information that can be used to describe the content of the segment. Examples may include, but are not limited to, capturing context (e.g., scene setting, shot type, shot duration), story setting (e.g., tempo, time in storyline), character setting (e.g., main character, supporting character), or action setting (e.g., talking, running, walking). A segment property may also refer to any metadata associated with the segment (e.g. the start time, the finish time, the duration, or the director's preference).

A story may also be received or referenced as an additional input at the inputting step 110. The story may comprise a plurality of story fragments, where each story fragment conveys semantically consistent parts of the story being narrated. The received story may be narrated by content items, where each segment from the content items represents a coverage option of contiguous story fragments in the story. Coverage options can be considered as different camera setups (angles, shot sizes) for a particular scene. During production 30 it is often important to record a scene from different camera angles using different shot sizes to emphasize key elements of the film. Different coverage options of the same scene are regarded as different shots for that scene. It is traditionally vital to shoot multiple shots for a scene, for they not only can keep things dynamic and exciting within the scene, but also provide greater options for movie editing.

One story fragment may be represented by one or a plurality of segments. Segments can be aligned with the story fragments based on their relations. In one implementation, such relation may be described by the time lapse along the storyline. Specifically, both the story fragments and the segments may be defined by the start and finish time along the storyline. In another implementation, the relation may be characterized by scene settings. For example, different story fragments define different scene settings, and thus the related segments correspond to multiple shots captured under the same scene setting.

A prioritisation score may be received for each story fragments, which defines the importance of each story fragment along the storyline. In one arrangement, the prioritisation scores may be described by a function depending on the time along the storyline. For example the function can be a monotonically decreasing function which assigns decreasing scores to story fragments down the storyline. In another arrangement, the prioritisation scores may be influenced by the movie director. In other words, the prioritisation scores may be described by a function which accepts the input from directors. For example, if the director favours the second and third story fragments more than any other story fragments in the story, then those story fragments will be given higher scores than the rest of the story fragments.

The method 100 then proceeds to a (second) inputting step 120. In step 120, a quality measure is received for each segment, which describes the content quality in the corresponding segment. Quite often a higher quality measure indicates better quality. The quality measure may be estimated from factors which may include, but are not limited to, camera factors (e.g., camera shakiness, smoothness in camera motion), video encoding factors (e.g., video compression quality/rate), image quality factors (e.g., blur, illumination, contrast, and burned pixels), and performance factors (e.g., dialogue, continuity, pace, etc.). Any combination of one or more of the factors may be used to determine a quality measure. Means for obtaining the various factors for the quality measure may include, but are not limited to, manual input, software-based computations (including using quality estimation algorithms implemented on computers) and hardware-based computations (including using quality estimation algorithms implemented using integrated circuitry), etc.

The method 100 then proceeds to a (third) inputting step 130 where one or more candidate sequences are received. A candidate sequence describes a possible way for assembling segments into the rough cut, which is an intermediate sequence that tells the received story. Candidate sequences can be made by utilizing the factors which may include, but are not limited to editing and cinematographic style preference. Editing style preferences is concerned with duration and transitions. For example, actions such as fighting or smiling may be associated with a close up shot; a close up shot may follow a wide shot to ensure smooth shot transition and to maintain context between individual shots in telling the story. Cinematographic style preferences are preferences on shot size, camera angle and the like. The candidate sequences may be created manually by a production company, a creative director, etc. Alternatively, they can be created by machine learning algorithms that learn the characteristics of existing movie products.

Each candidate sequence contains a sequence of segment candidates, each of which defines constraints on the aforementioned segment properties. Depending on the constraints, a plurality of segments may match one segment candidate. The constraints may be defined quantitatively, which may be a threshold on the likelihood of a segment property. For example, one segment candidate may match segments whose likelihood of being a wide shot is higher than 80%. Alternatively, constraints may be defined qualitatively. For example, a segment candidate may match segments which contain the main character. A segment may be assigned to one segment candidate if the property of that segment matches the constraints defined by the segment candidate. A mixture of quantitative and qualitative constraints may also be used to constrain the segments.

The method 100 proceeds to a determining step 140, where an order of content items is determined by the processor 605. An item score is derived for each item based on the received quality measures, and the candidate sequences. The prioritisation score from story fragments may also be used. An item score indicates the priority of the content item for processing to achieve efficient post editing. Content items with higher priority may be processed earlier. A method 170 of computing item scores, as preferably executed at step 140, will be described below with reference to FIG. 1C. The method 100 terminates at step 150, where item scores have been derived for content items and the order of processing (scheduling) of content items is then determined by the derived item scores. The processing may be one of transcoding, transferring, duplication, image processing, converting, or colour grading operations.

Figure 1C:
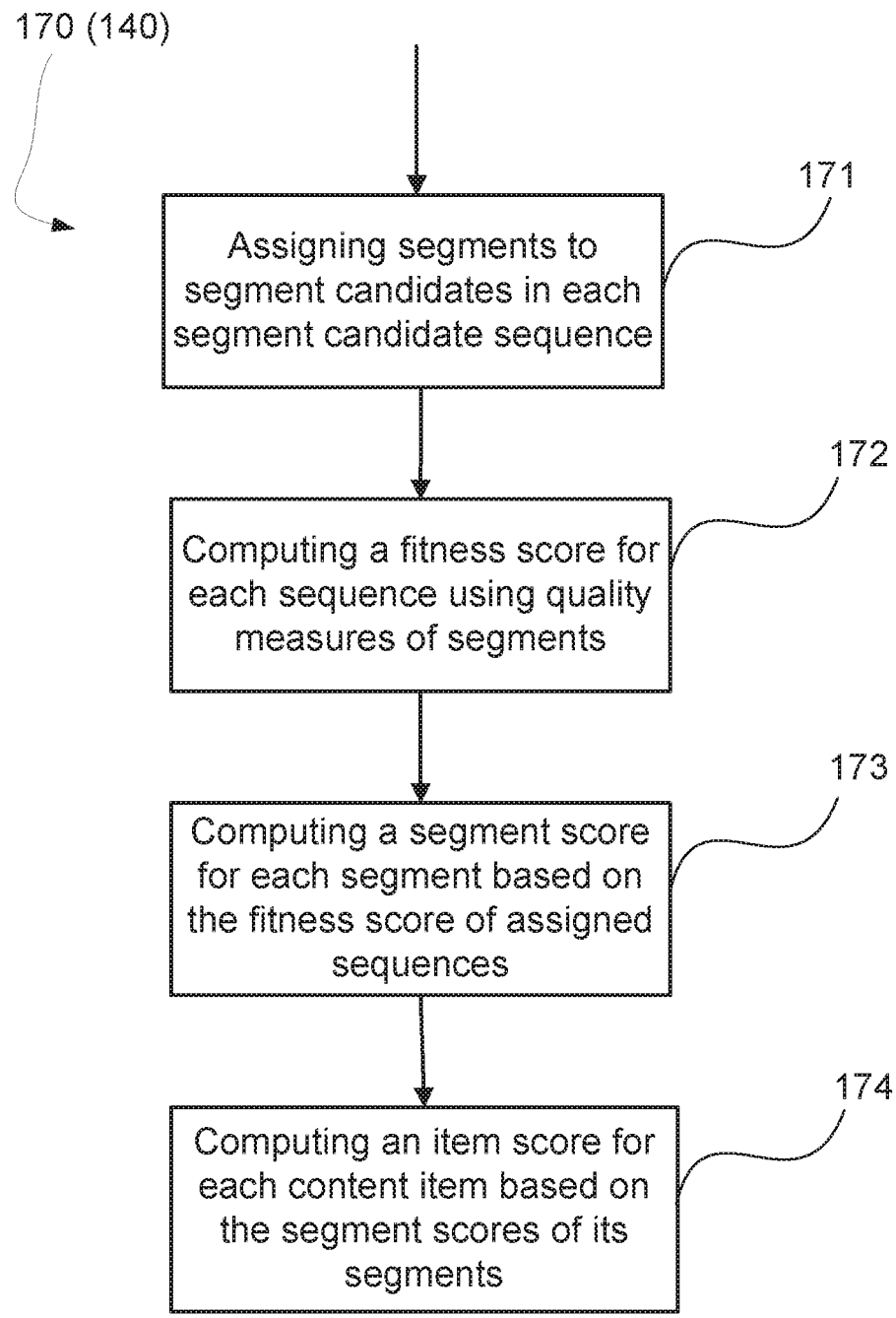

In FIG. 1C, the method 170 of computing item scores begins at an assigning step 171, where segments are assigned to segment candidates from the candidate sequences. As described above, a segment may be assigned to one segment candidate if a property of the segment satisfies the constraint defined by that segment candidate. The assigning step 171 generates a set of assigned candidate sequences, each of which refers to a candidate sequence that has an assigned segment for each of its segment candidates. In one arrangement, each segment is assigned to only the best-matched segment candidate. In another arrangement, one segment can be assigned to multiple matched segment candidates.

The method 170 proceeds to a (first) computing step 172, where a fitness score is computed by the processor 605 for each assigned candidate sequence based on the quality measures of the corresponding segments. The computation of step 172 can be realized by, but not limited to, an aggregate function. The aggregation function refers to a function that accepts a plurality of independent values and outputs a single value of more significant meanings. Examples may include, but are not limited to, functions such as average, count, maximum, median, or sum. A fitness score computed by the step 172 reveals the quality of the assigned candidate sequence. In one example, the assigned candidate sequence that has the maximum fitness score may be selected to proceed with the workflow. In another example, all assigned candidate sequences may be selected to proceed with the workflow.

The method 170 then proceeds to a (second) computing step 173. The computing step 173 computes a segment score for each segment, in light of the candidate sequences outputted from the computing step 172. In one implementation, the number of occurrences for each segment in the candidate sequences is ignored, which results in binary values for the segment scores. For example, if one segment is contained in the assigned candidate sequence then it may be assigned a binary value of "1", otherwise the corresponding segment score may be "0". In another implementation, the number of occurrence for each segment in the candidate sequences is taken into account. As a result, the segment score for each segment is computed as an integer value.

The method 170 then proceeds to a (third) computing step 174, where an item score may be computed for each content item, based on the segment scores of its segments. The prioritisation scores for corresponding story fragments may also be used. The basic unit for transcoding is a content item. Consequently it is important to consolidate all the segment scores into one item score for each content item. The item scores outputted by the method 170 show the ordering of content items for processing. In one implementation all segments from one content item may be treated equally for the computation. In other words, each segment may be assigned the same weight. In another implementation, each segment is assigned a different weight, which may be computed based on static factors and dynamic factors, where static factors may comprise story prioritisation scores and dynamic factors may comprise the director's preferences. And therefore each segment contributes differently for the item score computation. At the end of the computing step 174, each content item has an item score which facilitates the scheduling in step 150.

Figure 2:
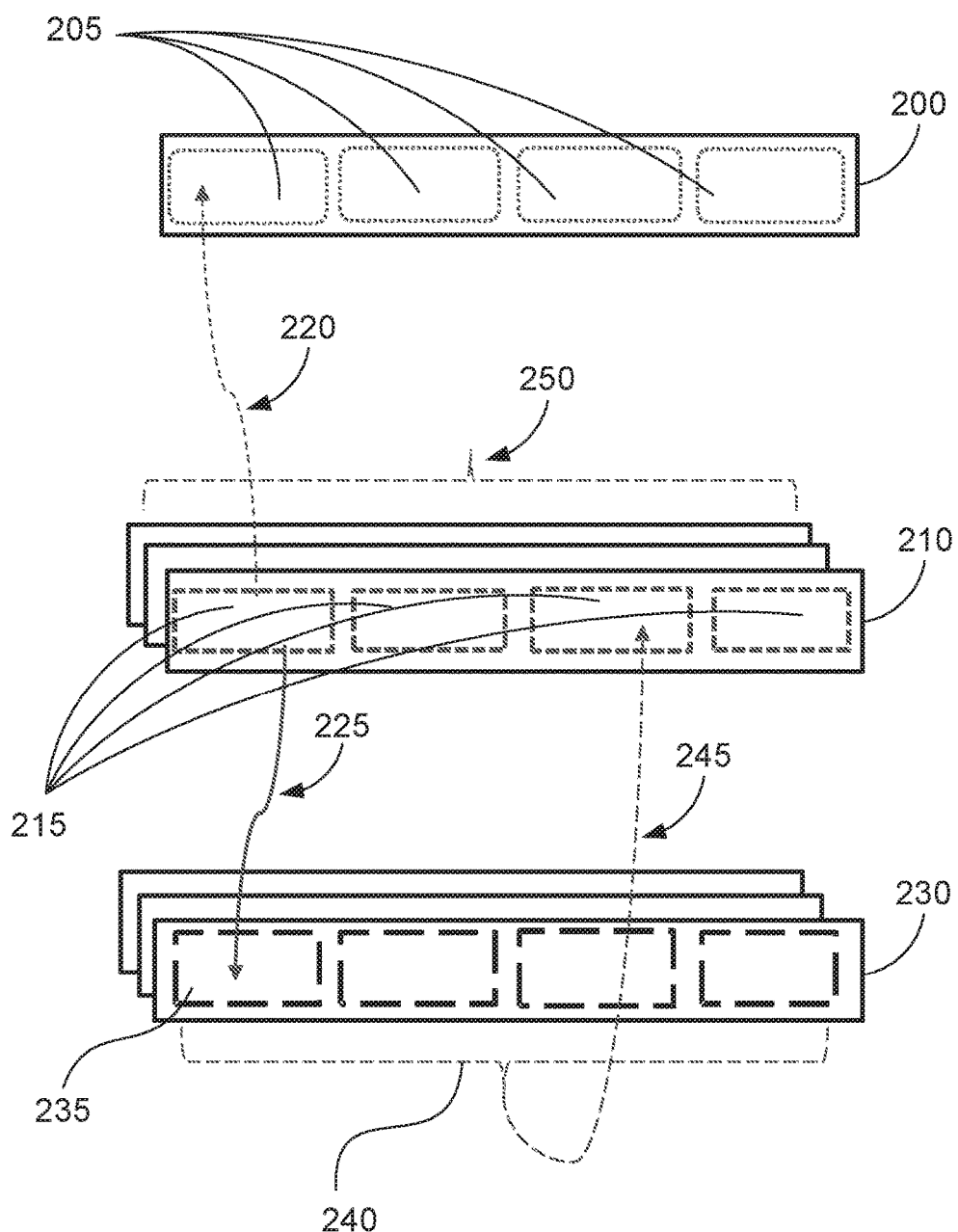
FIG. 2 is a schematic block diagram representation of a method of computing scores for content items according to the present disclosure.

FIG. 2 illustrates an example of the method 170 described in FIG. 1C. A story S 200 comprises a plurality of story fragments $\{s_1, s_2, s_3, s_4, \ldots, s_w\}$, where w is the total number of story fragments in S. Each story fragment $s_i$ 205 is characterised by a prioritisation score $o_i$.

A content item $M_i$ 210 comprises a plurality of segments $\{m_{i1}, m_{i2}, m_{i3}, m_{i4}, \ldots, m_{iN\_i}\}$, where N_i is the total number of segments in $M_i$. Each segment $m_{ij}$ 215 may be characterised by a property set $c_{ij}$ and a quality measure $e_{ij}$. Each segment 215 corresponds to one coverage option 220 of corresponding story fragment in the story 200.

A candidate sequence $L_j$ 230 consists of segment candidates $\{l_{j1}, l_{j2}, l_{j3}, l_{j4}, \ldots, l_{jw}\}$, each segment candidate $l_{ij}$ defines a set of constraints $\hat{c}_{ij}$ on segment properties. As described in step 171, a segment $m_{ij}$ may be assigned 225 to a segment candidate 235 $l_{hk}$ if $c_{ij}$ satisfies $\hat{c}_{hk}$. Once the assignment step 171 finishes, there exists a plurality of assigned candidate sequences.

According to the computing step 172, a fitness score $f_i$ may be computed for each assigned candidate sequence $L_i$, such that:

$$f_i = \Sigma_j Q(\delta(c_{ij}, \hat{c}_{hk}), e_{ij})$$

where Q is a function of $\delta(c_{ij}, \hat{c}_{hk})$ and $e_{ij}$, where $\delta(c_{ij}, \hat{c}_{hk})$ measures how much $c_{ij}$ satisfies $\hat{c}_{hk}$. In one implementation, $\delta(c_{ij}, \hat{c}_{hk})$ may be a discrete function which equals 1 if $c_{ij}$ satisfies $\hat{c}_{hk}$, 0 otherwise. Q may be implemented as the multiplication of $\delta(c_{ij}, \hat{c}_{hk})$ and $e_{ij}$ so that segments that do not satisfied with the constraints get zero values for Q, which then do not contribute to the fitness score. In another implementation, $\delta(c_{ij}, \hat{c}_{hk})$ may return a decimal value between 0 and 1 where a higher value indicates a greater similarity between $c_{ij}$ and $ĉ_{hk}$. Similarly Q may be implemented as the multiplication of $δ(c_{ij}, ĉ_{hk})$ and $e_{ij}$ so that segments with better quality and better constraint match contribute more to the fitness score. This computing step 172 is represented by reference 240 in FIG. 2.

Once the fitness score for each assigned candidate sequence has been obtained, a segment score is computed in light of the computing step 173. The segment score $t_{ij}$ for segment $m_{ij}$ may be computed based on the fitness scores of the assigned candidate sequences: $t_{ij}=P(f_{i1}, f_{i2}, ...)$, where $L_{i1}, L_{i2}, L_{i3}$ ... contain segment $m_{ij}$, and P is a function of the fitness scores $f_{i1}, f_{i2}, ...$. This computing step 173 is represented in FIG. 2 by reference 245. In one implementation, P is an aggregate function that sums up all the fitness scores for candidate sequence $L_{i1}, L_{i2}, L_{i3}, ...$, where $L_{i1}, L_{i2}, L_{i3}$ contain segment $m_{ij}$.

The workflow then proceeds to the computing step 174, where an item score may be computed for each content item. The score $g_i$ for each content item $M_i$ is computed based on the segment scores $\{t_{ij}\}$ from its segments and also prioritisation scores $\{o_k\}$ from the story: $g_i=G(\{t_{ij}\}, \{o_j\})$, where G is a function of $\{t_{ij}\}$ and $\{o_j\}$. In one implementation, G is a scalar product such that $g_i=\Sigma_j t_{ij}*o_j$. This computing step 174 is represented in FIG. 2 by reference 250.

As shown in FIG. 2, the feed forward computation 240 exemplifies steps 171 and 172 in the workflow, whereas the feed backward computation 245 exemplifies steps 173 and 174. The compound of feed forward and feed backward computation accounts for the story coverage and also the content quality of each content item.

Figure 3:
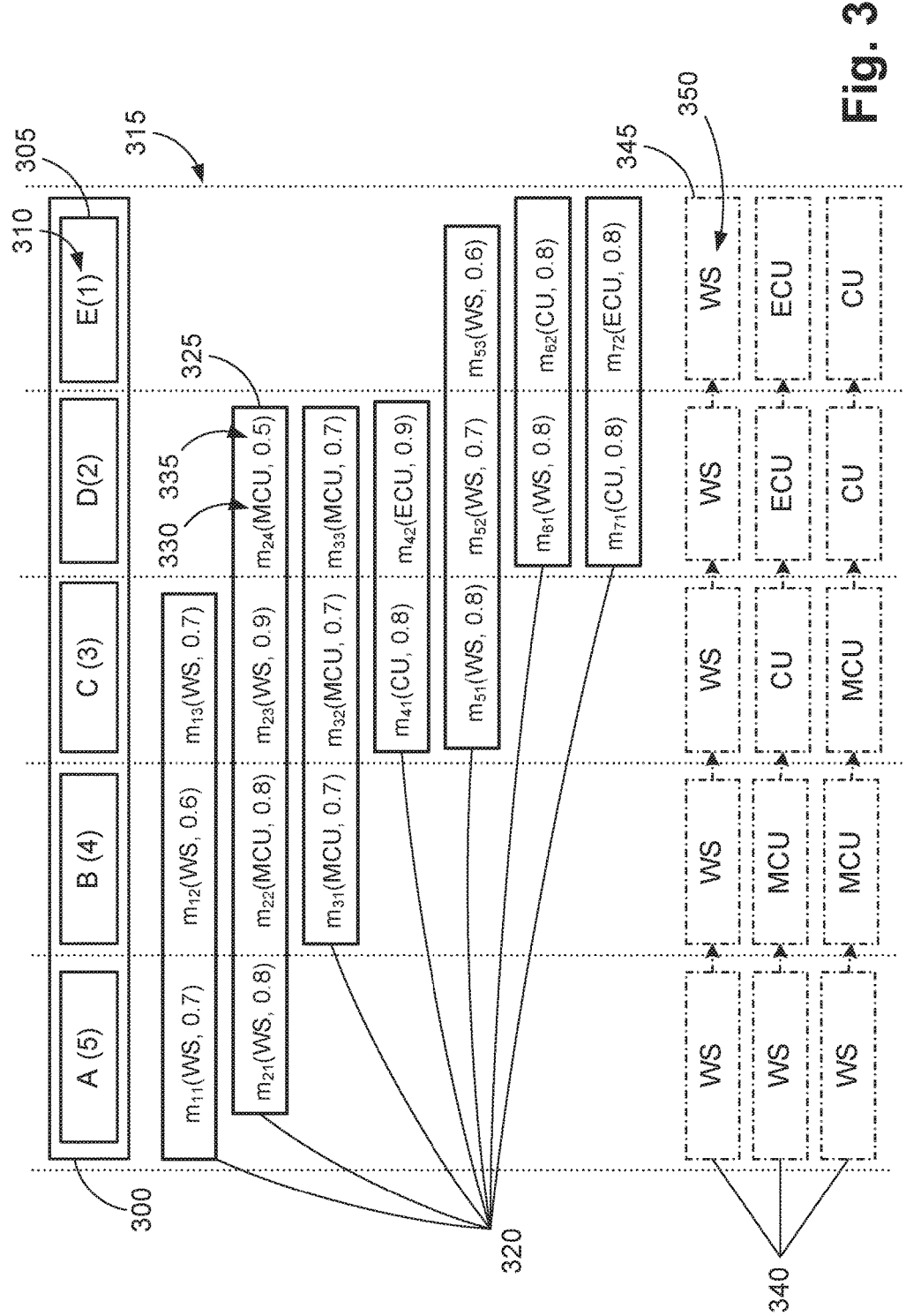
FIGS. 3, 4 and 5 collectively illustrate an example of scheduling processing of content items according to the present disclosure.
Figure 4:
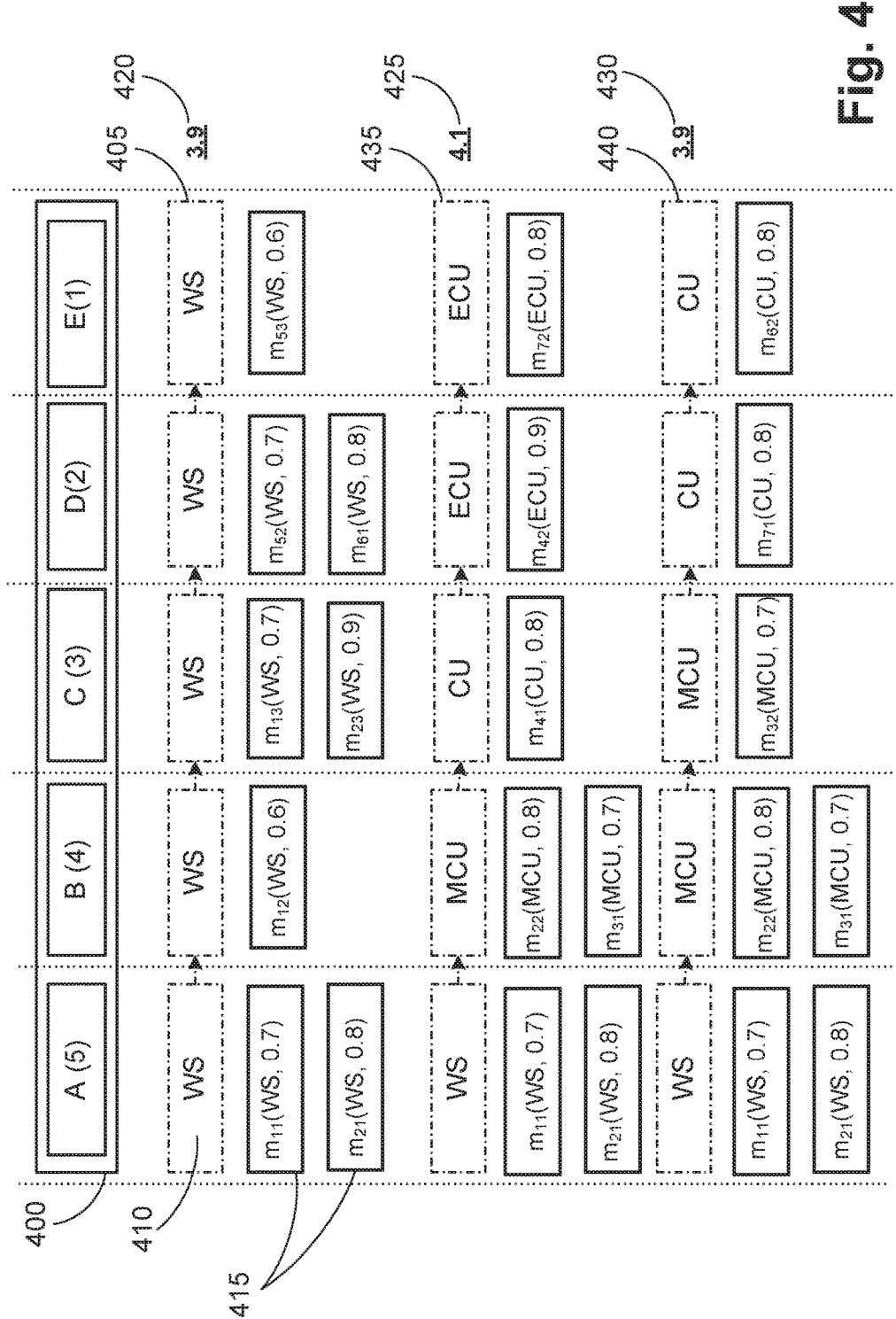
Figure 5:
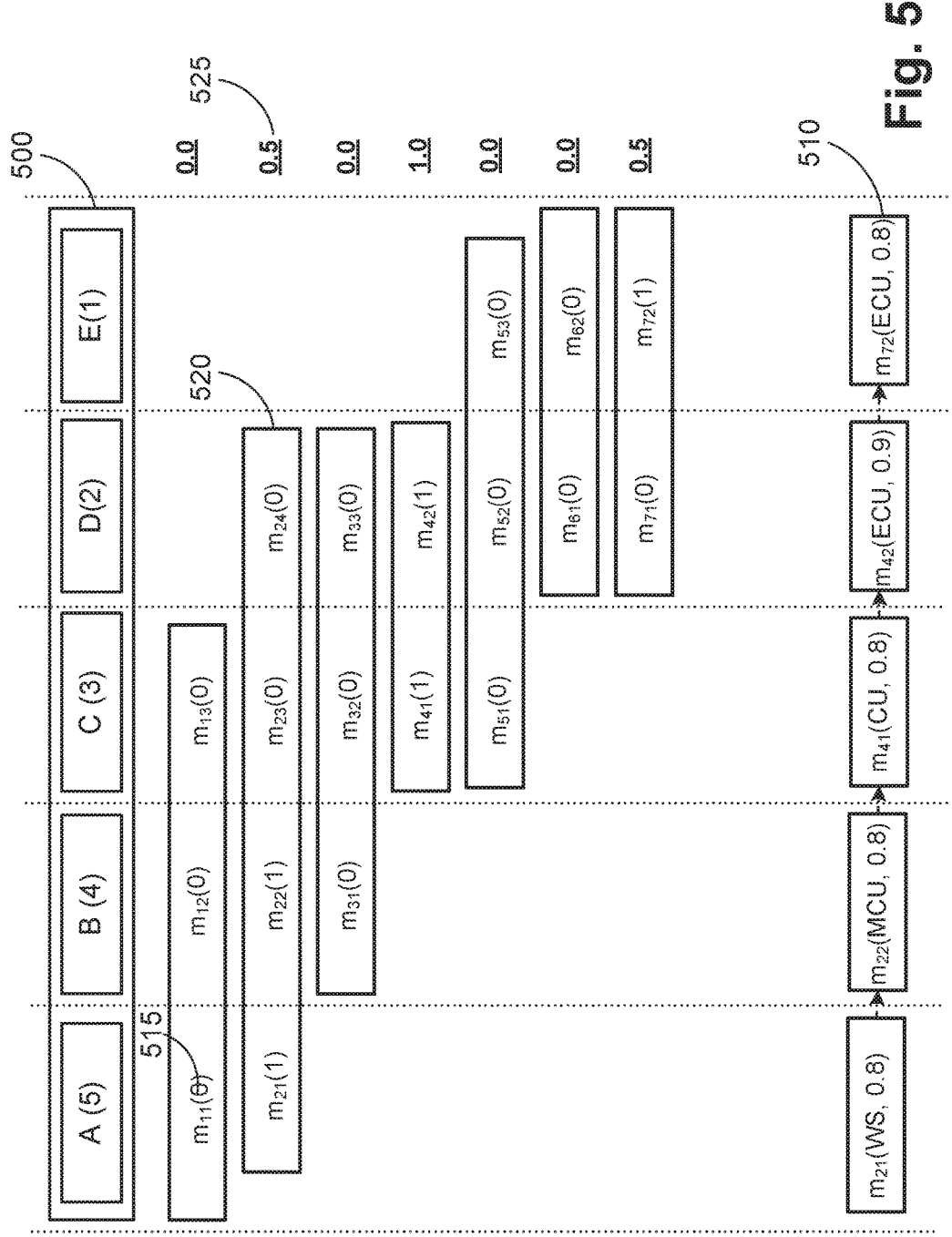

FIGS. 3, 4 and 5 collectively shows an example of scheduling processing of content items according to one implementation. In particular, FIG. 3 demonstrates steps 110, 120, and 130 in FIG. 1B. A story 300 comprising story fragments 305 is received in FIG. 3. Each story fragment 305 has a prioritisation score 310. In this example there are 5 story fragments in this story, namely A, B, C, D, and E, and their prioritisation scores are 5, 4, 3, 2 and 1 respectively. Therefore, the prioritisation scores are decreasing along the story line, meaning the fragments that occur earlier possess more importance.

Based on the given story, a set 320 of content items have been shot. Each content item is divided into a plurality of segments. A segment $m_{ij}$ 325 is characterised by a property 330 and a quality measure 335. In this example the segment property is defined qualitatively as the shot type of the segment. Shot types are defined with respect to the viewing distance between the audience and the subject. Examples of shot types may include:

(i) Wide Shot (WS): In this shot the subject takes up the full frame. This shot presents the whole subject to the audience.

(ii) Mid Shot (MS): This shot shows part of the subject in more detail, which gives the audience the feeling as if they were looking at the subject.

(iii) Medium Close Up (MCU): The MCU shows a closer look of the subject than MS. The face of the subject is shown more clearly.

(iv) Close Up (CU): In the close up shot, a part of a certain feature of the subject is shown in the frame. A close-up of a person emphasizes their emotional state.

(v) Extreme Close Up (ECU): In a typical Extreme Close Up shot the subject's whole/partial face occupies the full frame.

On the other hand the quality measure 335 is a value between 0 and 1. A higher quality measure indicates better quality of the segment 325.

A set 340 of one or more candidate sequences is received. Each candidate sequence is made up of a plurality of segment candidates. A segment candidate 345 defines a set of constraints 350 on segments. In this example, the constraints are defined with regard to shot types. The shot type for each segment may be obtained by human perception or via classifiers trained using machine learning. A segment may be assigned to a segment candidate if the shot type of the segment and that of the segment candidate are the same.

As shown in FIG. 3, the received content items and candidate sequences are aligned properly with the story fragments. Such alignment can be realized by the processor 605 attaching timestamps down the storyline to the segments and segment candidates.

FIG. 4 exemplifies steps 171 and 172 in FIG. 1C. As shown in FIG. 4, segments are assigned to different candidate sequences. For example, candidate sequence $L_1$ 405 can be assigned with five segment candidates $\{I_{11}, I_{12}, I_{13}, I_{14}, I_{15}\}$. Two segments 415 have been assigned to segment candidate $I_{11}$ 410, namely $m_{11}$, and $m_{21}$. This is because the shot types of $m_{11}$, and $m_{21}$ are both Wide Shot, which satisfy the constraint of $I_{11}$.

Now that segments have been assigned to candidate sequences, a fitness score may be calculated for each candidate sequence. In this example a fitness score is calculated by summing the maximum quality measures from assigned segments. For candidate sequence $L_1$ 405, its fitness score 420 is computed by summing 0.8 (from $m_{21}$), 0.6 (from $m_{12}$), 0.9 (from $m_{23}$), 0.8 (from $m_{61}$), and 0.6 (from $m_{53}$). The fitness score 420 for candidate sequence $L_1$ 405 therefore has the value 3.7. The fitness scores 425 and 430 for the candidate sequences $L_2$ 435 and $L_3$ 440 are computed in similar fashion. The candidate sequence $L_2$ 435 has the highest fitness score 425 with a value of 4.1, and hence it may be used to determine the order for processing.

As depicted in FIG. 4, the assigned candidate sequence $L_2$ 435 has the best fitness score 425 with a value of 4.1 when it is assigned with the following segments: $\{m_{21}, m_{22}, m_{41}, m_{42}, m_{72}\}$. At the same time, $L_2$ may be considered as a version of "rough cut". Assigned segments of the candidate sequence $L_2$, namely $\{m_{21}, m_{22}, m_{41}, m_{42}, m_{72}\}$, should be processed with higher priorities.

FIG. 5 continues with the demonstration of steps 173 and 174 from FIG. 1C. As mentioned above, the assigned candidate sequence, now represented by reference 510, $L_2=\{m_{21}, m_{22}, m_{41}, m_{42}, m_{72}\}$, has the best fitness score and thus it is used as a rough cut sequence. The step 174 calculates the item score based on segment scores. In this example, segment scores are firstly computed as binary scores. If a segment $m_{ij}$ is included in $L_2$, then its segment score is 1. Otherwise the score is set to 0. For example, the segment score 515 for $m_{11}$ is 0.

In light of the binary segment scores, item scores are calculated for each item. In this example, each segment is treated equally, and the item score for a content item is calculated as the mean segment scores of all its segments. For example, the item score 525 for content item $M_2$ 520 is calculated as the mean value of $\{1, 1, 0, 0\}$, which in this case has the value 0.5. The item score calculation accomplishes the step 174.

At this stage of the scheduling processing, each content item has an item score. The determining step 140 in FIG. 1B determines the order of content items for $\{M_1, M_2, M_3, M_4, M_5, M_6, M_7\}$ based on the item scores, which in the present example is therefore $M_4, M_2, M_7, M_1, M_3, M_5, M_6$. The scheduling step 150 in FIG. 1B then processes the content items according to the determined order.

INDUSTRIAL APPLICABILITY

The arrangements described are applicable to the computer and data processing industries and particularly for the scheduling of media items for processing in digital film production. Whilst the arrangements have specific applicability to narrative film making, the principles and process disclosed herein are also useful in other forms of digital production including television commercials, television drama, documentaries, animation, audio (e.g. musical) works, wedding videography, corporate videography, and the like. A significant output of the disclosed methods is a schedule of media content items. Such a schedule permits convenient processing of the items for movie production.

The foregoing describes only some embodiments of the present invention, and modifications and/or changes can be made thereto without departing from the scope and spirit of the invention, the embodiments being illustrative and not restrictive.

The invention claimed is:

1. A method of scheduling processing of a plurality of recorded media content items, each recorded media content item having one or more media segments which each represent a coverage option for a story fragment, said method comprising:
   receiving a quality measure for each media segment in the plurality of recorded media content items;
   determining a fitness score for each of a plurality of candidate sequences formed from the media segments, said fitness score being determined using the corresponding quality measure associated with media segments in the corresponding candidate sequence;
   selecting a candidate sequence from the plurality of candidate sequences having a highest fitness score;
   assigning a media segment score to each media segment, wherein a media segment score of 1 is assigned to each media segment included in the candidate sequence having the highest fitness score, and a media segment score of 0 is assigned to each media segment not included in the candidate sequence having the highest fitness score; and
   scheduling processing of the plurality of recorded media content items in an order determined from the media segment scores of the media segments in the recorded media content items.

2. A method according to claim 1, further comprising receiving one or more candidate sequences defining constraints on the segments for representing story fragments.

3. A method according to claim 2, wherein the constraints on the segments can be defined using at least one of the following factors:
   (i) capturing context;
   (ii) story setting;
   (iii) character setting;
   (iv) action setting; and
   (v) associated segment metadata.

4. A method according to claim 1, wherein processing of the plurality of the recorded media content items is scheduled for one of transcoding, transferring, duplication, image processing, converting, or colour grading operations.

5. A method according to claim 1, wherein the quality measure is estimated using at least one of the following factors:
   (i) camera factors;
   (ii) video encoding factors;
   (iii) image quality factors; and
   (iv) performance factors.

6. A method according to claim 1, further comprising receiving a prioritisation of each of the story fragments represented by the segments, wherein the scheduling further comprises using the prioritisation of story fragments associated with the corresponding media segment.

7. A method according to claim 1, wherein the receiving of factors for the quality measure comprises at least one of manual input, software-based computations, software-based computations using quality estimation algorithms implemented on computers, hardware-based computations, and hardware-based computations using quality estimation algorithms implemented using integrated circuitry.

8. A method according to claim 1, wherein the candidate sequences are created by at least one of manually, by one of a production company and a creative director, and by machine learning algorithms that learn the characteristics of existing movie products.

9. Computer apparatus according to claim 1, wherein the method further comprises receiving one or more candidate sequences defining constraints on the segments for representing story fragments.

10. Computer apparatus according to claim 9, wherein the constraints on the segments can be defined using at least one of the following factors:
    (i) capturing context;
    (ii) story setting;
    (iii) character setting;
    (iv) action setting; and
    (v) associated segment metadata.

11. A non-transitory computer readable storage medium having a program recorded thereon, the program being executable by a processor to schedule processing of a plurality of recorded media content items, each recorded media content item having one or more media segments which each represent a coverage option for a story fragment, said program comprising:
    code for receiving a quality measure for each media segment in the plurality of recorded media content items;
    code for determining a fitness score for each of a plurality of candidate sequences formed from the media segments, said fitness score being determined using the corresponding quality measure associated with media segments in the corresponding candidate sequence;
    code for selecting a candidate sequence from the plurality of candidate sequences having a highest fitness score;
    code for assigning a media segment score to each media segment wherein a media segment score of 1 is assigned to each media segment included in the candidate sequence having the highest fitness score, and a media segment score of 0 is assigned to each media segment not included in the candidate sequence having the highest fitness score; and
    code for scheduling processing of the plurality of recorded media content items in an order determined from the media segment scores of the media segments in the recorded media content items.

12. A non-transitory computer readable storage medium according to claim 11, further comprising code for receiving one or more candidate sequences defining constraints on the segments for representing story fragments.

13. A non-transitory computer readable storage medium according to claim 12, wherein the constraints on the segments can be defined using at least one of the following factors:
   (i) capturing context;
   (ii) story setting;
   (iii) character setting;
   (iv) action setting; and
   (v) associated segment metadata.

14. A non-transitory computer readable storage medium according to claim 11, wherein processing of the plurality of the recorded media content items is scheduled for one of transcoding, transferring, duplication, image processing, converting, or colour grading operations.

15. A non-transitory computer readable storage medium according to claim 11, wherein the quality measure is estimated using at least one of the following factors:
   (i) camera factors;
   (ii) video encoding factors;
   (iii) image quality factors; and
   (iv) performance factors.

16. A non-transitory computer readable storage medium according to claim 11, further comprising code for receiving a prioritisation of each of the story fragments represented by the segments, wherein the scheduling further comprises using the prioritisation of story fragments associated with the corresponding media segment.

17. Computer apparatus including a processor, and a memory storage device upon which a program is recorded, the program being executable by the processor to perform a method of scheduling processing of a plurality of recorded media content items, each recorded media content item having one or more media segments which each represent a coverage option for a story fragment, said method comprising:
   receiving at the processor a quality measure for each media segment in the plurality of recorded media content items;
   determining by the processor a fitness score for each of a plurality of candidate sequences formed from the media segments, said fitness score being determined using the corresponding quality measure associated with media segments in the corresponding candidate sequence;
   selecting by the processor, a candidate sequence from the plurality of candidate sequences having a highest fitness score;
   assigning by the processor, a media segment score to each media segment, wherein a media segment score of 1 is assigned to each media segment included in the candidate sequence having the highest fitness score, and a media segment score of 0 is assigned to each media segment not included in the candidate sequence having the highest fitness score; and
   forming a schedule for processing of the plurality of recorded media content items in an order determined from the media segment scores of the media segments in the recorded media content items.

18. Computer apparatus according to claim 17, wherein:
   (a) processing of the plurality of the recorded media content items is scheduled for one of transcoding, transferring, duplication, image processing, converting, or colour grading operations;
   (b) the quality measure is estimated using at least one of the following factors:
      (i) camera factors;
      (ii) video encoding factors;
      (iii) image quality factors; and
      (iv) performance factors;
   (c) the receiving of factors for the quality measure comprises at least one of manual input, software-based computations, software-based computations using quality estimation algorithms implemented on computers, hardware-based computations, and hardware-based computations using quality estimation algorithms implemented using integrated circuitry; and
   (d) the candidate sequences are created by at least one of manually, by one of a production company and a creative director, and by machine learning algorithms that learn the characteristics of existing movie products.

19. Computer apparatus according to claim 17, wherein the method further comprises receiving a prioritisation of each of the story fragments represented by the segments, wherein the scheduling further comprises using the prioritisation of story fragments associated with the corresponding media segment.

20. A schedule of media content items for the processing of a plurality of recorded media content items, each recorded media content item having one or more media segments which each represent a coverage option for a story fragment, said schedule being formed by a method comprising:
   receiving a quality measure for each media segment in the plurality of recorded media content items;
   determining a fitness score for each of a plurality of candidate sequences formed from the media segments, said fitness score being determined using the corresponding quality measure associated with media segments in the corresponding candidate sequence;
   selecting a candidate sequence from the plurality of candidate sequences having a highest fitness score;
   assigning a media segment score to each media segment, wherein a media segment score of 1 is assigned to each media segment included in the candidate sequence having the highest fitness score, and a media segment score of 0 is assigned to each media segment not included in the candidate sequence having the highest fitness score; and
   forming the schedule of the plurality of recorded media content items in an order determined from the media segment scores of the media segments in the recorded media content items.

* * * * *